United States Patent
Umehara et al.

(10) Patent No.: US 6,510,029 B2
(45) Date of Patent: Jan. 21, 2003

(54) THIN FILM MAGNETIC HEAD WITH IMPROVED INSULATING PROPERTIES AND METHOD OF MANUFACTURING THE SAME

(75) Inventors: Toshio Umehara, Tokyo (JP); Hiroya Kamiizumi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 09/740,550

(22) Filed: Dec. 19, 2000

(65) Prior Publication Data

US 2001/0053051 A1 Dec. 20, 2001

(30) Foreign Application Priority Data

May 29, 2000 (JP) ........................................ 2000-158897

(51) Int. Cl.⁷ .............................................. G11B 5/39
(52) U.S. Cl. ................... 360/318.1; 360/320
(58) Field of Search .............................. 360/318, 318.1, 360/126, 317, 320

(56) References Cited

U.S. PATENT DOCUMENTS

| | | | | |
|---|---|---|---|---|
| 4,920,011 A | * | 4/1990 | Ogawa et al. | 335/216 |
| 4,966,648 A | * | 10/1990 | Nakamura et al. | 204/192.36 |
| 5,103,553 A | * | 4/1992 | Mallary | 29/603.13 |
| 5,136,447 A | * | 8/1992 | Makino et al. | 360/126 |
| 5,184,394 A | * | 2/1993 | Hsie et al. | 29/603.14 |
| 5,218,497 A | * | 6/1993 | Tanabe et al. | 360/126 |
| 5,264,980 A | * | 11/1993 | Mowry et al. | 204/192.2 |
| 5,552,949 A | * | 9/1996 | Hashimoto et al. | 324/252 |
| 5,949,627 A | * | 9/1999 | Williams et al. | 360/126 |
| 6,101,067 A | * | 8/2000 | Matsuzono et al. | 360/317 |
| 6,195,872 B1 | * | 3/2001 | Sasaki | 216/22 |

FOREIGN PATENT DOCUMENTS

| | | | |
|---|---|---|---|
| JP | 10-289414 | * | 10/1998 |
| JP | 10-334425 | | 12/1998 |

\* cited by examiner

*Primary Examiner*—Brian E. Miller
(74) *Attorney, Agent, or Firm*—Greer, Burns & Crain, Ltd.

(57) ABSTRACT

The thin film magnetic head has insulating layers and a MR element section, which has uniform thickness and which can be formed on a surface of a magnetizable substrate with enough insulating strength. In the thin film magnetic head, a magnetizable metal layer is formed on a surface of the magnetizable substrate. A first insulating layer is formed on a surface of the magnetizable metal layer. The MR element section for reproducing data is formed on a surface of the first insulating layer. A second insulating layer is formed on the MR element section so as to sandwich the MR element section between the first insulating layer and the second insulating layer. A shielding layer is formed on a surface of the second insulating layer.

5 Claims, 4 Drawing Sheets

THIN FILM MAGNETIC HEAD WITH IMPROVED INSULATING PROPERTIES AND METHOD OF MANUFACTURING THE SAME

BACKGROUND OF THE INVENTION

The present invention relates to a thin film magnetic head, in which magnetic resistance (MR) element sections are formed on an insulating layer formed on a surface of a magnetizable metal substrate, and a method of manufacturing the thin film magnetic head.

Thin film magnetic heads for reproducing data, each of which includes magnetic resistance element sections for reproducing data, which are formed on an insulating layer formed on a surface of a magnetizable substrate, are assembled in magnetic tape memory devices.

A conventional thin film magnetic head, which is a separate type magnetic head assembled in a magnetic tape memory device, is shown in FIG. 6. FIG. 6 is an explanation view showing a summarized structure of the head. The separate type magnetic head has a magnetic resistance element section 10 for reproducing data (hereinafter referred to as "reproducing head section") and a magnetic resistance element section 12 for writing data (hereinafter referred to as "writing head section"), which are arranged side by side, on a surface of a magnetizable substrate 14 (e.g., Ni—Zn-Ferrite substrate) for shielding a lower part, with a proper separation. In FIG. 6, one reproducing head section 10 and one writing head section 12 are shown, but many reproducing head sections 10 and many writing head sections 12 are formed on the magnetizable substrate 14 of the actual magnetic head.

Firstly, the reproducing head section 10 will be explained.

The head sections 10 and 12 are formed on the magnetizable substrate 14, and the substrate 14 acts as a lower shielding layer of the reproducing head section 10.

A first insulating layer 16, which is made of a non-magnetizable GAP material (e.g., alumina), is formed on the surface of the magnetizable substrate 14. The first insulating layer 16 acts as a half-GAP.

An MR element section 18 (e.g., SAL/Ta/MR type) is formed on a surface of the first insulating layer 16.

A pair of Co—Cr—Pt/MR terminals 20 (hereinafter referred to as "MR terminals") are respectively provided on both sides of the MR element section 18.

A second insulating layer 22, which is made of a non-magnetizable GAP material (e.g., alumina), is formed on the surface of the first insulating layer 16 so as to cover over the MR element section 18 and the MR terminals 20.

Namely, the MR element section 18 and the MR terminals 20 are sandwiched between the two insulating layers 16 and 22. The second insulating layer 22 acts as an insulating film of an upper shielding layer 24 and the half-GAP.

An upper shielding layer 24, which is made of a soft magnetic metal film, is formed on a surface of the second insulating layer 22.

A protection layer 26 is formed on a surface of the upper shielding layer 24.

Next, the writing head section 12 will be explained.

The magnetizable substrate 14 supplements a lower magnetic pole 28.

The lower magnetic pole 28, which is a soft magnetic metal film, is formed on the surface of the magnetizable substrate 14.

A write-GAP 30 is made of a non-magnetizable GAP material (e.g., alumina).

An upper magnetic pole 32, which is a soft magnetic metal film, is formed on a surface of the write-GAP 30.

The protection layer 26 is formed on a surface of the upper magnetic pole 32.

The Ni—Zn-Ferrite substrate is employed as the magnetizable substrate 14, on which the reproducing head section 10 and the writing head section 12 are formed, by following reasons.

Firstly, the Ni—Zn-Ferrite material is a stable oxide which has superior magnetic property (e.g., greater specific resistance) and superior high frequency property. Secondly, the Ni—Zn-Ferrite material has greater hardness, so it is a proper material to contact a magnetic tape, which is pressed there onto with high contact pressure. Namely, the Ni—Zn-Ferrite material has superior tape-touch property and tape-slide property. Thirdly, the Ni—Zn-Ferrite material has high reliability and superior records of employment. Besides the head of the magnetic tape memory device, magnetic heads employing the Ni—Zn-Ferrite substrates have been assembled in heads for flexible memory media (e.g., VTR tapes, flexible disks).

However, the Ni—Zn-Ferrite substrate has following disadvantages.

These days, required memory density of the magnetic tape memory is higher and higher, so that the first insulating layer 16 and the second insulating layer 22 of the reproducing head section 10 must be thinner.

But the Ni—Zn-Ferrite material is a sintered material, so a large number of fine holes 34 (see FIG. 7) are formed therein. With this structure, the fine holes 34 are opened in the surface of the magnetizable substrate 14 when the surface of the magnetizable substrate 14 is abraded. In FIG. 7, the fine hole 34 is opened in the surface of the magnetizable substrate 14. The fine hole 34 is a hollow hole and formed by a HIP manner. A maximum diameter of the fine hole 34 is about 5 $\mu$m.

If the first insulating layer 16, the MR element section 18 and the second insulating layer 22 are directly formed on the surface of the magnetizable substrate 14, in which the fine holes 24 are opened, by sputtering, the films 16, 18 and 22 fall into the fine holes 34. Therefore, the films 16, 18 and 22 are partially depressed, so that thickness of the films 16, 18 and 22 are made partially thinner.

If the first insulating layer 16 and the second insulating layer 22 are made thinner so as to make the memory density of the magnetic tape memory higher, the thickness of the films 16, 18 and 22 are made further partially thinner. By making the thin insulating layers 16 and 22 further partially thinner, enough insulating strength cannot be gained between the upper shielding layer 24 and the MR element section 18, so that number of bad products, whose insulating strength are lower than a prescribed strength, must be increased.

SUMMARY OF THE INVENTION

An object of the present invention is to provide a thin film magnetic head, in which insulating layers and an MR element having uniform thickness can be formed on a surface of a magnetizable substrate, which includes fine holes, with enough insulating strength. Another object of the present invention is to provide a method of manufacturing said thin film magnetic head.

To achieve the objects, the thin film magnetic head of the present invention comprises: a magnetizable substrate; a magnetizable metal layer being formed on a surface of the magnetizable substrate; a first insulating layer being formed on a surface of the magnetizable metal layer; a magnetic resistance effect (MR) element section for reproducing data being formed on a surface of the first insulating layer; a second insulating layer being formed on the magnetic resistance element section so as to sandwich the magnetic resistance element section between the first insulating layer and the second insulating layer; and a shielding layer being formed on a surface of the second insulating layer.

With this structure, the insulating layers and the MR element section are formed on the flat surface of the magnetizable metal layer, which has been formed on the magnetizable substrate, so that the insulating layers and the MR element section are not partially depressed even if fine holes are formed in the surface of the magnetizable substrate. Unlike the conventional magnetic head in which the insulating layers and the MR element section are directly formed on the uneven surface of the magnetizable substrate, the thickness of the insulating layers and the MR element section of the magnetic head of the present invention can be uniform. Therefore, the insulating strength of the MR element section can be improved, and number of the bad products, whose insulating strength are lower than the prescribed strength, can be reduced.

Another thin film magnetic head of the present invention comprises: a thin film magnetic head section for reproducing data; and another thin film magnetic head section for writing data, wherein the thin film magnetic head section for reproducing data includes said thin film magnetic head.

The method of the present invention comprises the steps of: forming a magnetizable metal layer on a surface of a magnetizable substrate; abrading a surface of the magnetizable metal layer so as to make the surface flat; forming a first insulating layer on the surface of the magnetizable metal layer; forming a magnetic resistance effect (MR) element section for reproducing data on a surface of the first insulating layer; forming a second insulating layer on the magnetic resistance element section so as to sandwich the magnetic resistance element section between the first insulating layer and the second insulating layer; and forming a shielding layer a surface of the second insulating layer.

In the method, the magnetizable metal layer may be made of a soft magnetic metal. With this method, the magnetizable substrate is also made of the soft magnetic metal, so the magnetizable metal layer and the magnetizable substrate have the same magnetic property and shielding property.

The soft magnetic metal has greater abrasion resistance, corrosion resistance, etc. Further, a surface of the soft magnetic metal can be easily abraded so as to make the flat mirror face. Especially, even if the surface is abraded by chemical-mechanical polishing, the soft magnetic properly is not badly influenced. Fe—Al—Si, Fe—N, Fe—Si—N, Co—Zr—Nb, etc. may be employed as the soft magnetic metal, which has the greater abrasion resistance and whose magnetic property can be easily controlled.

In the method, the chemical-mechanical polishing may be executed in the abrading step so as to make the surface of the magnetizable metal layer flat and smooth like a mirror face.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
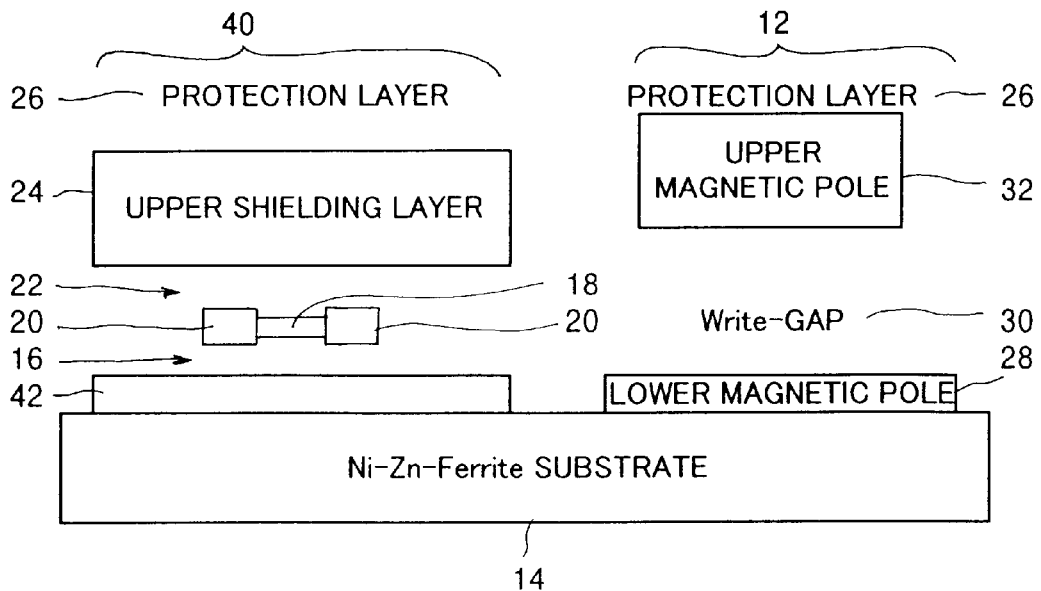
FIG. 1 is an explanation view of the separate type thin film magnetic head of an embodiment of the present invention.
Figure 7:
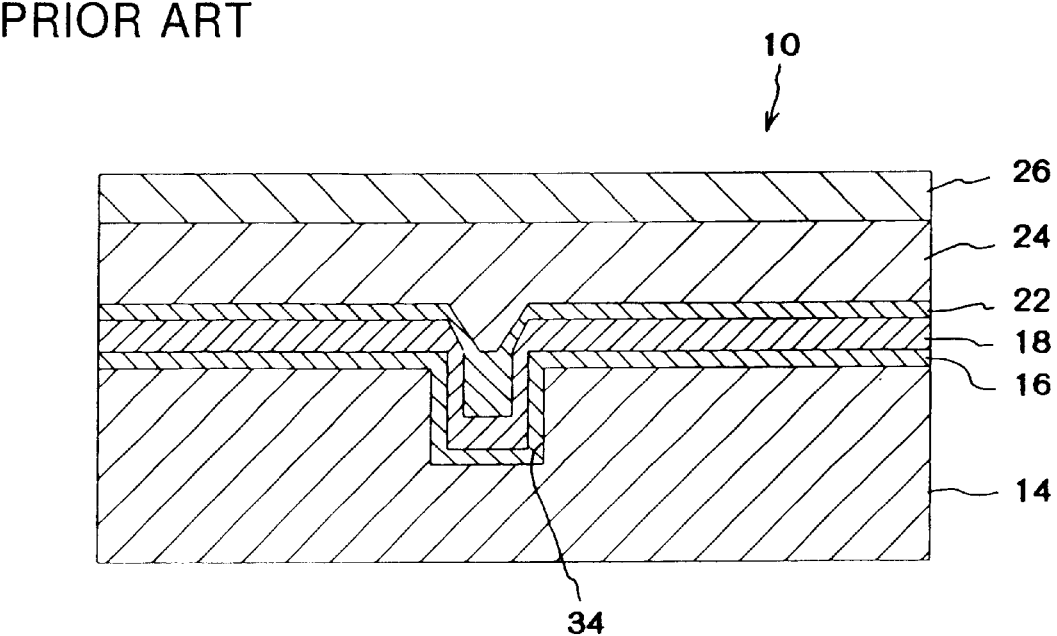
FIG. 7 is a partial enlarged view of the main part of the conventional thin film magnetic head shown in FIG. 6.

Firstly, a structure of a separate type thin film magnetic head of an embodiment will be explained with reference to FIG. 1. Note that, the elements explained in BACKGROUND OF THE INVENTION are assigned the same symbols and explanation will be omitted.

The structure of the writing head section 12 is equal to that of the writing head section of the conventional magnetic head.

A structure of a reproducing head section 40 will be explained with reference to FIGS. 1 and 2D.

A magnetizable metal layer (e.g., soft magnetic metal film) 42 is formed on a surface of the magnetizable substrate (e.g., Ni—Zn-Ferrite substrate) 14 so as to fill the fine holes 34, which are opened in the surface of the magnetizable substrate 14. A surface of the magnetizable metal layer 42 is made flat and smooth.

The first insulating layer (e.g., alumina) 16 is formed on the flat surface of the magnetizable metal layer 42.

The MR element section 18 is formed on the surface of the first insulating layer 16. A pair of MR terminals 20 are respectively provided on the both sides of the MR element section 18.

The second insulating layer (e.g., alumina) 22 is formed on the surface of the first insulating layer 16 so as to cover over the MR element section 18 and the MR terminals 20.

The shielding layer 24, which is made of soft magnetic metal film, is formed on the surface of the second insulating layer 22.

The protection layer 26 is formed on the surface of the shielding layer 24.

In the present embodiment, the surface of the magnetizable substrate 14, in which the fine holes 34 are opened, is covered with the magnetizable metal layer 42, whose surface is made flat and smooth, so that the depressions, which correspond to the fine holes 34, are not formed in the first insulating layer 16, the MR element section 18 and the second insulating layer 22. Therefore, the first insulating layer 16, the MR element section 18 and the second insulating layer 22 can be made flat, and they can be respectively formed with uniform thickness. The insulating strength between the upper shielding layer 24 and the MR element section 18 can be improved, and number of producing the reproducing head sections 10 having enough insulating strength can be increased. Namely, the thin film magnetic heads having enough insulating strength can be securely produced.

Figure 3:
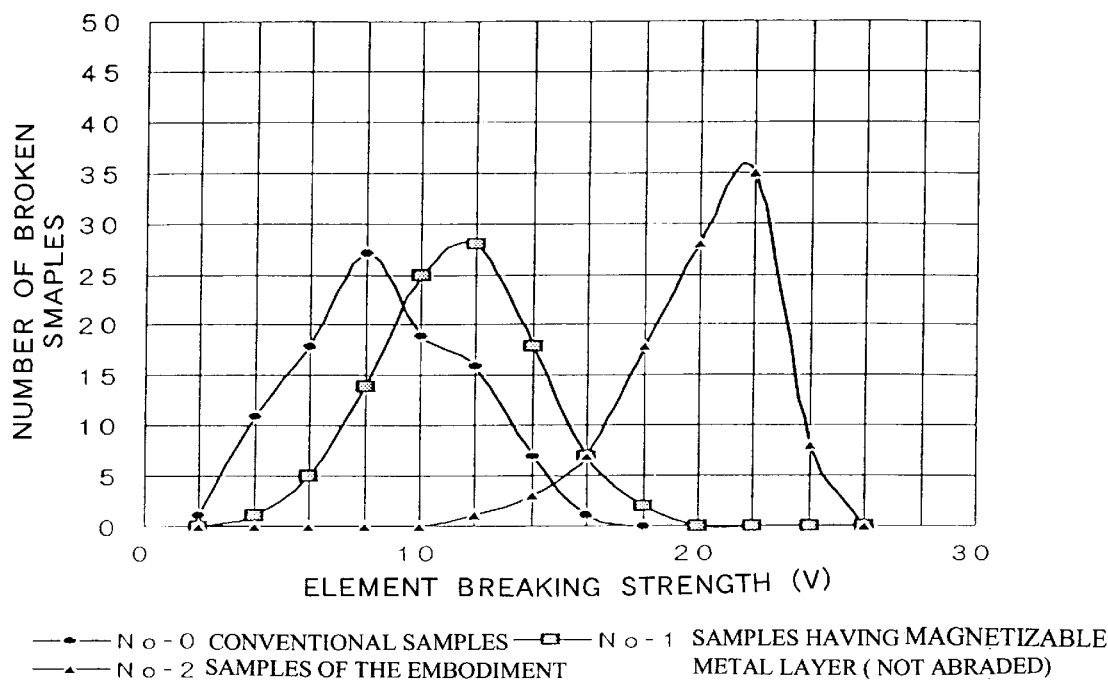
FIG. 3 is a graph showing a relationship between breaking strength of MR elements and number of breaking the MR elements.
Figure 4:
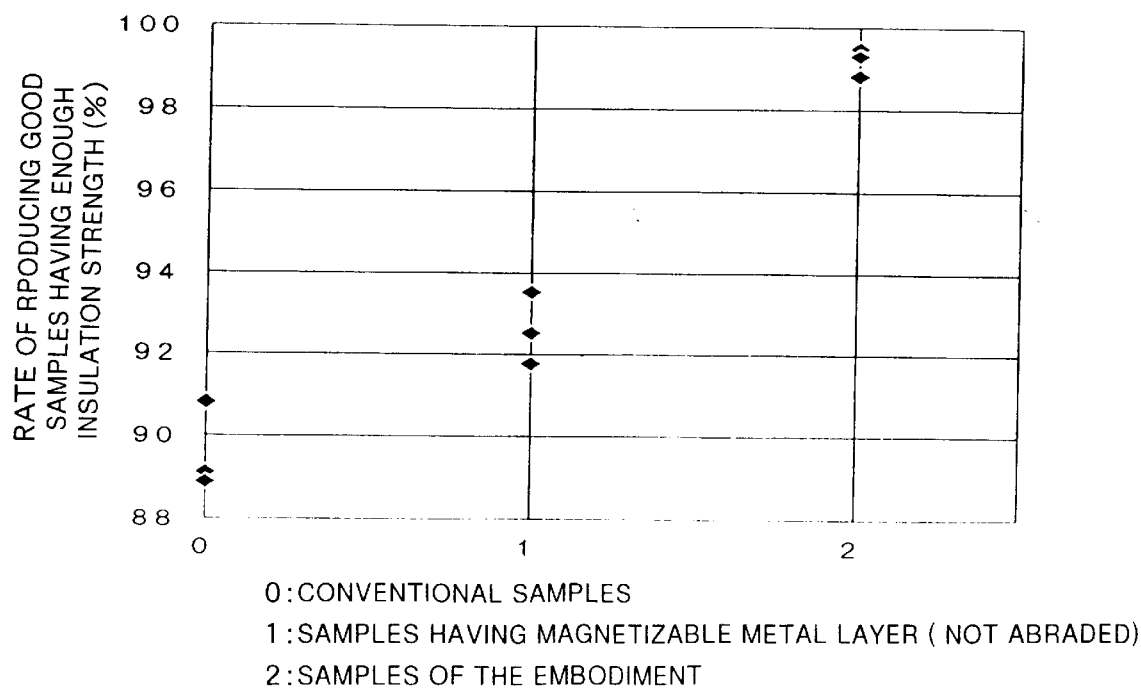
FIG. 4 is a graph showing rate of producing the good magnetic heads, which have enough insulating strength.

The improvement of the insulating strength is shown in graphs of FIGS. 3 and 4. The experiment was executed under following conditions: 100 samples were prepared; voltage was inputted to the upper shielding layer 24 and the MR element section 18 of the reproducing head section 10 of each sample; the inputted voltage was changed; and number of broken samples, in which the MR element sections 18 were broken, was counted. In FIG. 3, the axis of abscissas indicates the inputted voltage as element breaking strength; the axis of ordinates indicates the number of broken samples. The samples include three types: (1) the conventional magnetic heads having no magnetizable metal layer; (2) magnetic heads, which had the magnetizable metal layers 42 but whose surfaces were not abraded; and (3) the magnetic heads of the present embodiment, which had the magnetizable metal layers 42 and whose surfaces were abraded by the chemical-mechanical polishing (CMP). The graph of FIG. 4 shows rate of producing the magnetic heads having enough insulating strength.

By merely forming the magnetizable metal layer 42, the element breaking strength and the rate of producing the good samples having enough insulating strength could be slightly improved with respect to the conventional samples. Further, in the samples of the present embodiment, the surfaces of the magnetizable metal layers 42 were abraded and made flat by CMP, so that the input voltage indicating the element breaking strength could be highly increased (see FIG. 3) and the rate of producing the good samples could be improved to 99% (see FIG. 4).

Successively, the method of manufacturing the thin film magnetic head will be explained. Note that, the writing head section 12 of the magnetic head is made by the conventional method, so explanation will be omitted. The manufacturing steps of making the reproducing head section 40 will be explained with reference to FIGS. 2A–2D.

Figure 2A:
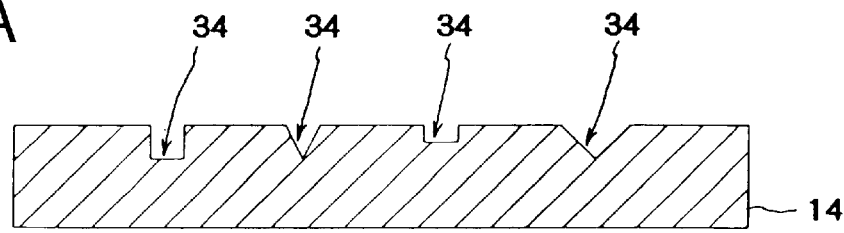
FIGS. 2A–2D are explanation views showing the steps of manufacturing the magnetic head.

In FIG. 2A, the surface of the magnetizable substrate 14 is abraded to make flat and smooth. In this state, some fine holes 34 are opened in the surface of the magnetizable substrate 14.

Figure 2B:
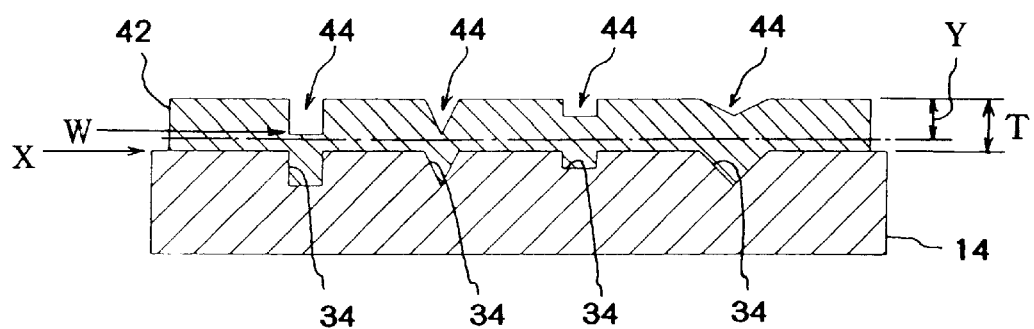

Next, as shown in FIG. 2B, the magnetizable metal layer 42 is formed on the surface of the magnetizable substrate 14 by sputtering, so that the opened fine holes 34 are filled. Preferably, the magnetizable metal layer 42 is film of soft magnetic metal (e.g., Fe—Al—Si, Fe—N, Fe—Si—N, Co—Zr—Nb), which has greater abrasion resistance and whose magnetic property can be easily controlled.

By the fine holes 34 in the surface of the magnetizable substrate 14, depressions 44 are formed in the surface of the magnetizable metal layer 42. Thickness "T" of the magnetizable metal layer 42 is designed so as to locate an inner bottom face "W" of the deepest depression 44 above the upper surface "X" of the magnetizable substrate 14. According to experiments, the required thickness "T" of the magnetizable metal layer 42 is almost equal to a diameter of the largest fine hole 34. For example, if the diameter of the largest fine hole 34 is about 5 $\mu$m; the required thickness "T" of the magnetizable metal layer 42 is also about 5 $\mu$m.

Figure 2C:
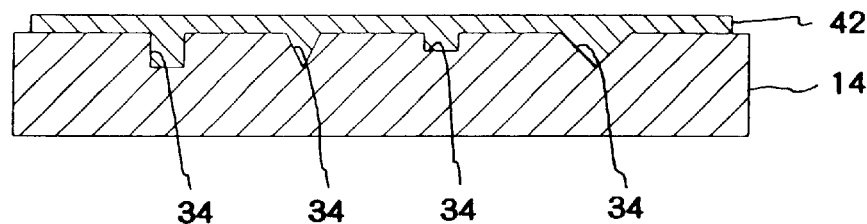

In FIG. 2C, the surface of the magnetizable metal layer 42 is abraded by CMP so as to remove the depressions 44 therein. Amount "Y" of abrading the magnetizable metal layer 42 is equal to or more than a depth of the deepest depression 44. By abrading the amount "Y", the surface of the magnetizable metal layer 42 can be made flat and smooth. If the surface is abraded by CMP, the surface of the magnetizable metal layer 42 can be made more flat and smooth like a mirror face.

Figure 2D:
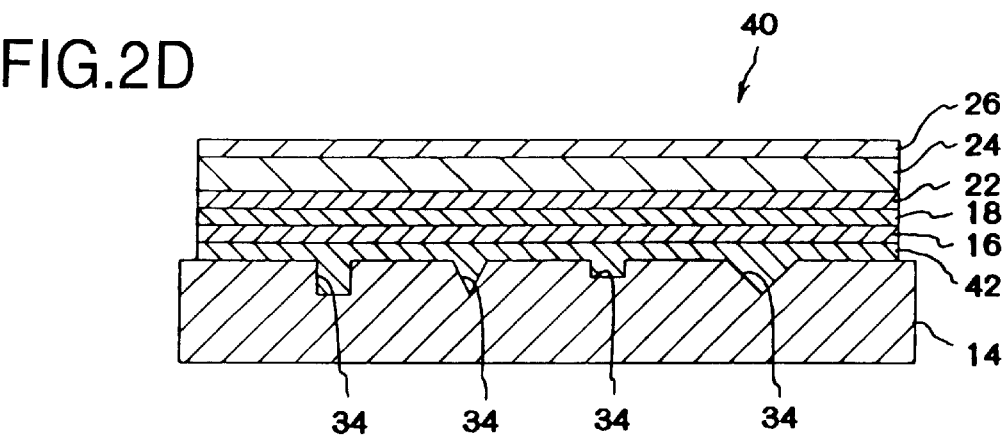

In FIG. 2D, the first insulating layer 16, the MR element section 18 and the second insulating layer 22 are formed, by sputtering, on the flat surface of the magnetizable metal layer 42 as well as the conventional method. Further, the upper shielding layer 24, which is the soft magnetic metal film, by plating, on the surface of the second insulating layer 22. Finally, the protection layer 26 is formed on the surface of the upper shielding layer 24. With these steps, the reproducing head section 40 is completely manufactured.

Figure 5:
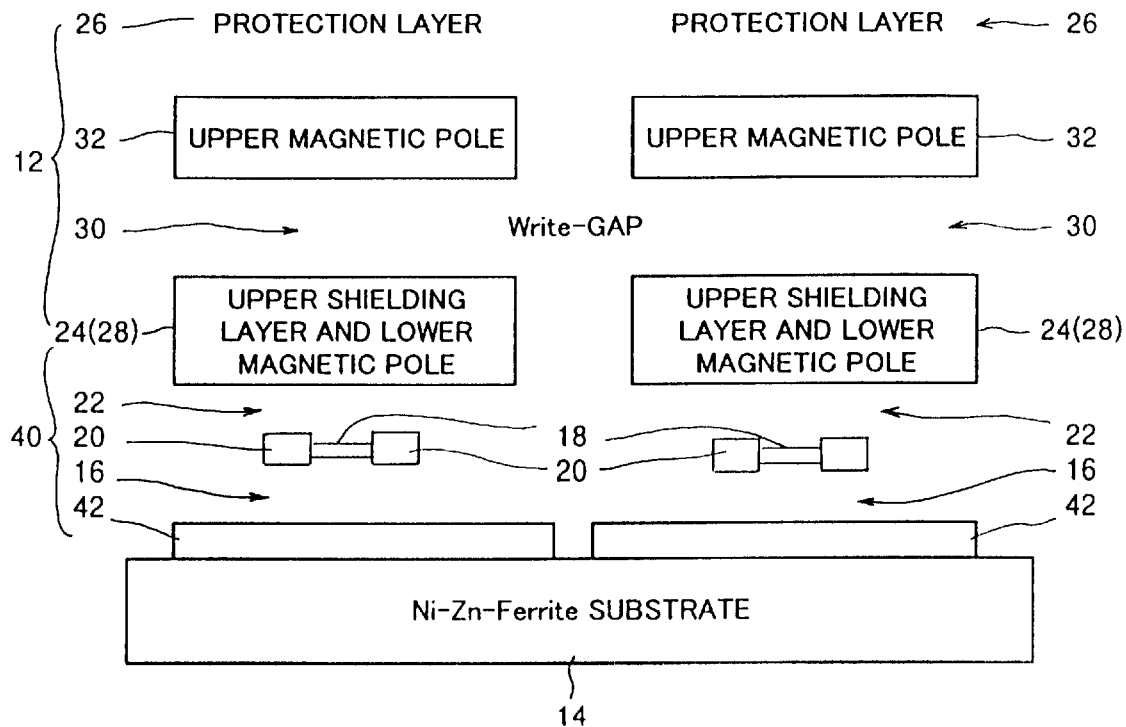
FIG. 5 is an explanation view of a pile type thin film magnetic head of another embodiment.
Figure 6:
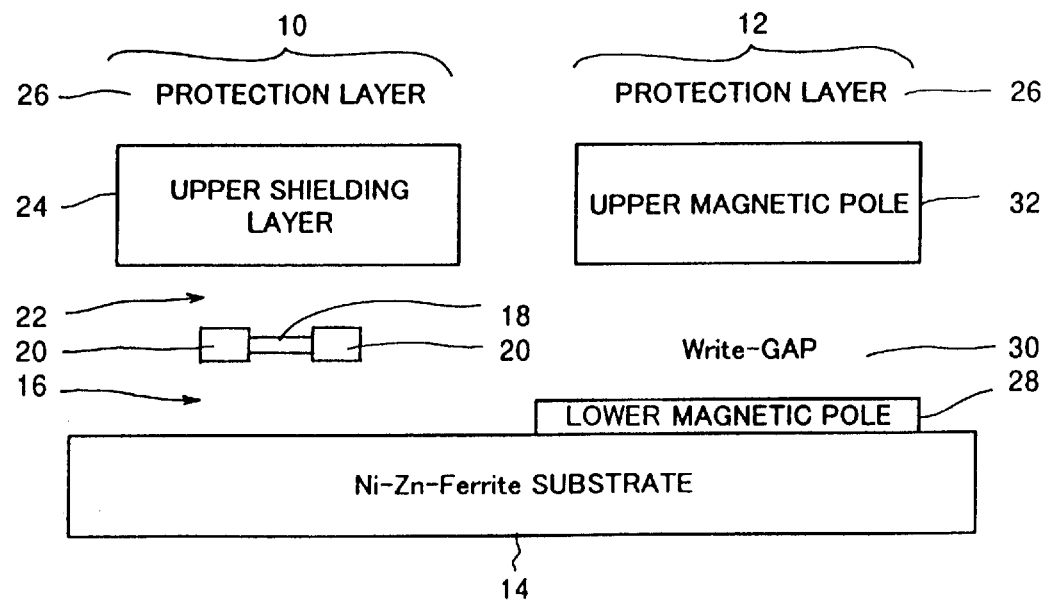
FIG. 6 is an explanation view of the conventional separate type thin film magnetic head.

In the thin film magnetic head of the above described embodiment, the reproducing head sections 40 and the writing head sections 12 are arranged, side by side with separations, on the surface of the magnetizable substrate 14. The method of manufacturing the thin film magnetic head can be applied to a pile type thin film magnetic head shown in FIG. 5. In another embodiment shown in FIG. 5, the reproducing head section 40 and the writing head section 12 are piled on the surface of the magnetizable substrate 14. In the present embodiment, the upper shielding layer 24 of the reproducing head section 40 acts as shielding means of the reproducing head section 40 and the lower magnetic pole 28 of the writing head section 12.

The thin film magnetic heads of the above described embodiments can be employed to not only magnetic tape memory devices but also hard disk drive units, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thin film magnetic head, comprising:

a magnetizable substrate;

a magnetizable metal layer being formed on a surface of said magnetizable substrate;

a first insulating layer being formed on a surface of said magnetizable metal layer;

a magnetic resistance effect section for reproducing data being formed on a surface of said first insulating layer;

a second insulating layer being formed on said magnetic resistance element section so as to sandwich said magnetic resistance element section between said first insulating layer and said second layer; and a shielding layer being formed on a surface of said second insulating layer, wherein said magnetizable metal layer does not form a pole of the magnetic head.

2. A thin film magnetic head, comprising:

a thin film magnetic head section for reproducing data; and a thin film magnetic head section for writing data, wherein said thin film magnetic head section for reproducing data includes a thin film magnetic head comprising:

a magnetizable substrate;

a magnetizable metal layer being formed on a surface of said magnetizable substrate;

a first insulating layer being formed on a surface of said magnetizable metal layer;

a magnetic resistance effect element section for reproducing data being formed on a surface of said first insulating layer;

a second insulating layer being formed on said magnetic resistance element section so as to sandwich said magnetic resistance element section between said first insulating layer and said second insulating layer; and a shielding layer being formed on a surface of said second insulating layer, wherein said magnetizable metal layer does not form a pole of the magnetic head.

3. A method of manufacturing a thin film magnetic head, comprising the steps of:

forming a magnetizable metal layer on a surface of a magnetizable substrate;

abrading a surface of said magnetizable metal layer so as to make the surface flat;

forming a first insulating layer on the surface of said magnetizable metal layer;

forming a magnetic resistance effect element section for reproducing data on a surface of said first insulating layer;

forming a second insulating layer on said magnetic resistance element section so as to sandwich said magnetic resistance element section between said first insulating layer and said second insulating layer; and forming a shielding layer a surface of said second insulating layer, wherein said magnetizable metal layer does not form a pole of the magnetic head.

4. The method according to claim 3, wherein said magnetizable metal layer is made of a soft magnetic metal.

5. The method according to claim 3, wherein chemical-mechanical polishing is executed in said abrading step.

* * * * *